United States Patent
Ullrich et al.

(10) Patent No.: US 9,650,783 B2
(45) Date of Patent: May 16, 2017

(54) FLAME RESISTANT LAMINATE (75) Inventors: Gerald Ullrich, Steinbrunn (AT);
Michael Horvath, Vienna (AT);
Michael Ketzer, Collenberg (DE);
Klaus Friedrich Gleich, Highland Ranch, CO (US)

(73) Assignees: FunderMax GmbH, St. Veit/Glan (AT); JohnsManville Europe GmbH, Bobingen (DE)

( * ) Notice: Subject to any disclaimer, the term of this patent is extended or adjusted under 35 U.S.C. 154(b) by 1036 days.

(21) Appl. No.: 13/820,818

(22) PCT Filed: Sep. 21, 2011

(86) PCT No.: PCT/EP2011/004718
§ 371 (c)(1),
(2), (4) Date: Aug. 19, 2013

(87) PCT Pub. No.: WO2012/038076
PCT Pub. Date: Mar. 29, 2012

(65) Prior Publication Data
US 2013/0323497 A1 Dec. 5, 2013

(30) Foreign Application Priority Data
Sep. 21, 2010 (EP) .................................... 10010014

(51) Int. Cl.
*E04B 1/94* (2006.01)
*B32B 5/26* (2006.01)
(Continued)

(52) U.S. Cl.
CPC ................ *E04B 1/941* (2013.01); *B32B 5/26* (2013.01); *B32B 27/20* (2013.01); *B32B 37/14* (2013.01); *B32B 2260/023* (2013.01); *B32B 2260/046* (2013.01); *B32B 2262/02* (2013.01); *B32B 2262/101* (2013.01); *B32B 2262/105* (2013.01); *B32B 2262/106* (2013.01); *B32B 2305/08* (2013.01); *B32B 2305/18* (2013.01); *B32B 2307/3065* (2013.01);
(Continued)

(58) Field of Classification Search
CPC ....... G01N 2021/1719; G01N 21/1717; G01N 21/27; G01N 21/31; G01N 2201/061; Y10T 428/249921; Y10T 428/249981; Y10T 428/27; Y10T 428/273
USPC ................. 156/60; 428/221, 316.6, 340, 341
See application file for complete search history.

(56) References Cited

FOREIGN PATENT DOCUMENTS

DE 202007007438 U1 9/2007
WO WO 02/053372 A1 7/2002
WO WO 2006/111458 A1 10/2006

*Primary Examiner* — Arti Singh-Pandey
(74) *Attorney, Agent, or Firm* — Hammer & Associates, P.C.

(57) ABSTRACT

A flame resistant laminate is described, which distinguishes itself by its low heating value ≤3 MJ/kg according to ISO 1716 and thanks to its special multilayer structure has excellent mechanical characteristics and an extraordinarily good stability under changing climatic conditions (hot/humid/cold/dry). The laminate according to the invention comprises several mineral and glass fiber non-woven fabrics with different functionalities and components. This includes high-filled non-woven fabrics, B-stage binders and other additives. Its great mechanical strength as well as the extraordinarily good stability under changing climatic conditions (hot/humid/cold/dry) allow its reasonable use in many areas where until now exclusively laminates according to EN 438 are used and beyond.

12 Claims, 1 Drawing Sheet

(51) Int. Cl.
*B32B 27/20* (2006.01)
*B32B 37/14* (2006.01)
(52) U.S. Cl.
CPC ..... *B32B 2317/125* (2013.01); *B32B 2361/00* (2013.01); *B32B 2607/00* (2013.01); *Y10T 156/10* (2015.01); *Y10T 428/249921* (2015.04); *Y10T 428/249981* (2015.04); *Y10T 428/27* (2015.01); *Y10T 428/273* (2015.01)

ical pre-products of the present invention can be implemented both symmetrically and asymmetrically.

FLAME RESISTANT LAMINATE

TECHNICAL FIELD

The invention relates to a novel, highly stable flame resistant panel material (laminate), the method for producing it, and use thereof.

PRIOR ART

It is known that laminated hardboards are used for internal and external applications in the construction industry as well as in other areas, wherein there are high requirements both to the hardboard surface and the hardboard core regarding various characteristics. A good overview of the desired hardboard properties and the testing methods is provided in the standard EN 438. Examples for the laminated hardboard properties described in EN 439 are in particular the bending strengths, tensile strengths, water absorption in different environments, soiling tendency, scratch resistances and abrasion resistances, resistances against water vapor or dry heat.

One of the most important characteristics of laminated hardboards in the building industry is their fire behaviour. The fire behaviour is classified in Europa according to EN13501-1. For non-flammable materials, according to ISO 1716, a heating value of the material s 3 MJ/kg is required.

Current flame-resistant laminated hardboards consist of (eventually also flame retardant) impregnated papers, which are pressed under high pressure and at temperatures about 150° C. in multi-platen presses to intrinsically homogeneous monolithic panel bodies with flame retardant synthetic resins.

The classification of these materials takes place, as mentioned above, according to EN13501-1, wherein the Class B1 (hardly inflammable), which can be obtained in the best case, is achieved. Based on the use of cellulose as carrier material and synthetic resins as a binding agent, fire class A can not be achieved in the traditional flame-resistant laminated hardboards with the prior art.

Fiber cement panels can be featured as A2 material, but they have very low mechanical strength.

Patent application WO 2006/111458 A1 describes a laminate panel as well as a method for manufacturing it, wherein it has a heating value ≤3 MJ/kg, as tested according to ISO 1716. The structure of the panel in WO 2006/111458 A1, prior to the pressing, is described as follows:

The structure has as a first layer impregnated (decorative) paper, then one or several layers of resinated glass fibers filled with at least one inorganic filler, wherein the ratio of resin to filler/glass fibers is selected in such a way that a heating value ≤3 MJ/kg, according to ISO 1716, can be achieved. The structure can be implemented both asymmetrically and also symmetrically with 1 or, respectively, 2 layers of impregnated paper as cover layers.

This structure allows the manufacturing of laminates with heating values ≤3 MJ/kg, according to ISO 1716, but it has clear weak points with respect to the mechanical strength and the water stability, as well as regarding the surface quality (gloss, homogeneity, smoothness) of the generated laminates. The non-flammable laminates, in particular those for use in intensively used interior areas and in the exterior areas, can not be manufactured with sufficient quality with this method.

The present invention aims at providing remedy in this respect.

BRIEF PRESENTATION OF THE INVENTION

The task of the invention now consists, in particular, in the manufacturing of laminates with excellent quality, which are mechanically very stable, preferably non-flammable laminates, i.e. such with a heating value ≤3 MJ/kg, according to ISO 1716, in particular for their use both in intensively used interior areas and in the exterior areas.

This task is solved according to the invention by a multilayer structure of the laminates, in particular according to the characteristic portions of the independent claims, wherein the different layers have different functionalities. The outer layer, which can consist of papers, fibers, non-woven fabrics or textures impregnated with natural and synthetic resins, permits to achieve an attractive surface quality of the laminate. The intermediate layer, which lies below, consists of (i) a special resinated "adhesive layer", which serves for improving the bonding of the intermediate layer to the core layer or, respectively, to the surface layer, and an underlying layer from a special, less resinated "reinforcement and protective layer", which contributes significantly to the strength behaviour and the mechanical quality of the end plate, or of (ii) a special, less resinated "reinforcement resp. stiffening layer", which contributes significantly to the strength behaviour and the mechanical values of the end plate, and an underlying specially resinated "adhesive layer", which serves for improving the bonding of the intermediate layer to the core layer resp. to the surface layer. The inner core area of the laminate consists of several highly filled core layers, which give the ready laminate its excellent stability with respect to the changing climatic conditions and humidity.

The laminates according to the invention are distinguished by a very high mechanical stability and excellent surface quality as well as by a very high stability with respect to the humidity under changing climatic conditions. Thanks to their extremely low heating value, they can be used in particular in areas of application where the traditional cellulose fiber/synthetic resin laminated hardboards can not be used due to their flammability.

Advantageous developments of the invention are to be drawn from the dependent claims.

BRIEF DESCRIPTION OF THE DRAWINGS

The structure of the laminate resp. laminate pre-products of the present invention can be implemented both symmetrically and asymmetrically.

One possible symmetric arrangement of the structure according to the invention is shown in FIG. 1. The laminate pre-product consists of the outer layer a2, onto which, optionally, a protective layer a1 can be placed. The layer b (adhesive layer) consists of one or several adhesive non-woven fabrics and is placed between the outer layer a and the stiffening layer c. The reinforcement layer c consists of one or more reinforcement non-woven fabrics. The core layer d consists of several highly filled textile surfaces which, after the pressing, are bonded together with all layers above and under them to produce a monolithic composite material.

Optionally, another adhesive layer b (not shown), which consists of one or several adhesive non-wovens, can be placed between the core layer d and the reinforcement layer c. From a laminate thickness >2 mm, for the purpose of extra increase of the mechanical stability, adhesive layers can be incorporated also in the laminate core.

In addition, FIG. 1 shows, by way of example, the typical course of the mechanical strengths, which increase from the laminate core outwards. After the pressing, all individual layers are inseparably bonded with each other.

SUBJECT MATTER OF THE INVENTION

Therefore, an object of the present invention is a preferably non-inflammable laminate, i.e. one having a heating value ≤3 MJ/kg according to ISO 1716, comprising:
A) a symmetrically or asymmetrically arranged laminate core, from a matrix comprising
 3-17% by weight of organic binder resin
 45-85% by weight of inorganic fillers
 10-25% by weight of inorganic and/or organic fibers,
 wherein the sum of the organic binder resin, the inorganic filler and the fibers gives 100% and the laminate core is built from multiple layers; however, after completion of the manufacturing of the product, the individual core layers are bonded inseparably with each other and with the functional layers above and below, and show further a density of at least 1.70 g/cm$^3$, determined according to EN ISO 1183-1:2004, preferably of at least 1.80 g/cm$^3$,
 a bending strength of at least 35 MPa, determined according to EN ISO 178:2003, preferably of at least 45 MPa,
 a bending modulus of at least 7 MPa, determined according to EN ISO 178:2003, preferably of at least 8.5 MPa,
B) at least one intermediate layer, which is applied onto at least one of both surfaces of the laminate core, comprising
 (i) at least one stiffening layer, which is applied onto at least one of both surfaces of the laminate core, wherein the stiffening layer comprises
  at least one layer, preferably at least two layers, made of textile fabric, which has a finally consolidated B-stage binder content of 5-30% by weight, wherein these data refer to the total weight of the textile surface with a binder after its transition to the B-stage state, and
 (ii) at least one adhesive layer, which is applied onto the surface of the stiffening layer facing away from the laminate core, wherein the adhesive layer comprises
  at least one layer, preferably at least two layers, made of textile fabric, which has a finally consolidated B-stage binder content of 40-80% by weight, wherein these data refer to the total weight of the textile surface with a binder after its transition to the B-stage state,
 or
 (iii) at least one adhesive layer, which is applied onto at least one of both surfaces of the laminate core, wherein the adhesive layer comprises
  at least one layer, preferably at least two layers, made of textile fabric, which has a finally consolidated B-stage binder content of 40-80% by weight, wherein these data refer to the total weight of the textile surface with a binder after its transition to the B-stage state, and
 (iv) at least one stiffening layer, which is applied onto the surface of the adhesive layer facing away from the laminate core, wherein the stiffening layer comprises
  at least one layer, preferably at least two layers, made of textile fabric, which has a finally consolidated B-stage binder content of 5-30% by weight, wherein these data refer to the total weight of the textile surface with a binder after its transition to the B-stage state,
C) at least one decorative layer, which is applied onto the surface of the intermediate layer facing away from the laminate core, wherein the decorative layer can have a multilayer structure,
D) if applicable, at least one protective layer, which is applied onto the surface of the decorative layer facing away from the laminate core, and
E) if applicable, at least one calming layer, which is arranged on the side of the decorative layer facing the laminate core.

The laminate according to the invention has in particular a very high mechanical stability.

The laminate core is structured in multiple layers; however, after completion of the manufacturing of the product, all core layers are bonded inseparably, i.e. irreversibly with each other and also with the functional layer above and below. The multilayer structure of the core can be detected by using microscopic analysis methods as well as by solving the material joints with mineral acids. The laminate core has preferably at least two layers, preferably at least three layers, particularly preferably at least 6 layers, in particular at least 7 layers.

The above-described laminate, the corresponding manufacturing process, and its use are object of the invention, as well as the laminate pre-products, which are described below and used according to the invention, and which are valuable intermediate products in the manufacturing of the laminates according to the invention.

Therefore, another object of the present invention is a laminate pre-product, which preferably has a heating value ≤3 MJ/kg according to ISO 1716, comprising:
A) a symmetrically or asymmetrically arranged laminate core, having
 at least two layers, preferably at least three layers, made of textile fabric filled with minerals, wherein the textile fabric is consolidated with a binder content of 5-20% by weight, wherein these data refer to the total weight of the textile surface, and
 is impregnated with 60 to 90% by weight of a core formulation, comprising:
  (i) 1 to 20% by weight, preferably 2 to 15% by weight, in particular 8 to 12% by weight, of thermally hardenable natural and/or synthetic resin,
  (ii) 40 to 90% by weight, preferably 45 to 80% by weight, in particular 50 to 75% by weight, of inorganic fillers,
  (iii) 1 to 30% by weight, preferably 4 to 25% by weight, in particular 9 to 18% by weight, of dilution water,
  and the obtained core layers were dried to a residual water content of up to 8% by weight, preferably to 5% by weight, and the resin was brought to a reactive B-stage state,
B) at least one intermediate layer, which is applied onto at least one of both surfaces of the laminate core, comprising
 (i) at least one stiffening layer, which is applied onto at least one of both surfaces of the laminate core, wherein the stiffening layer comprises
  at least one layer, preferably at least two layers, made of textile fabrics, which have each a B-stage binder content of 5-30% by weight in the B-stage state, wherein these data refer to the total weight of the textile surface with a binder after its transition to the B-stage state, and (ii) at least one adhesive layer, which is applied onto the surface of the stiffening layer facing away from the laminate core, wherein the adhesive layer comprises
at least one layer, preferably at least two layers, made of textile fabric, which has a B-stage binder content of 40-80% by weight in the B-stage state, wherein these data refer to the total weight of the textile surface with a binder after its transition to the B-stage state,
or
(iii) at least one adhesive layer, which is applied onto at least one of both surfaces of the laminate core, wherein the adhesive layer comprises
at least one layer, preferably at least two layers, made of textile fabric, which has a B-stage binder content of 40-80% by weight in the B-stage state, wherein these data refer to the total weight of the textile surface with a binder after its transition to the B-stage state, and
(iv) at least one stiffening layer, which is applied onto the surface of the adhesive layer facing away from the laminate core, wherein the stiffening layer comprises
at least one layer, preferably at least two layers, made of textile fabrics, which have each a B-stage binder content of 5-30% by weight in the B-stage state, wherein these data refer to the total weight of the textile surface with a binder after its transition to the B-stage state,
C) at least one decorative layer, which is applied onto the surface of the intermediate layer facing away from the laminate core, wherein the decorative layer can have a multilayer structure,
D) if applicable, at least one protective layer, which is applied onto the surface of the decorative layer facing away from the laminate core, and
E) if applicable, at least one calming layer, which is arranged on the side of the decorative layer facing the laminate core.

In a further design of the invention, the adhesive layer in the above-mentioned laminate or laminate pre-product may also assume the function of the decorative layer, when it is applied onto the surface of the stiffening layer facing away from the laminate core. Thus another object of the present invention is a laminate and a laminate pre-product, which contains the above-described, symmetrically or asymmetrically arranged laminate core, at least one of the above-described intermediate layer from supportive layers and adhesive layers, which, if necessary, takes over the function of a decorative layer, and, if necessary, one above-described protective layer as well as, if necessary, one above-described calming layer.

The manufacturing of the laminates according to the invention takes place by means of hot pressing of the laminate pre-product according to the invention, so that a monolithic composite material is obtained, in which the individual layers are fully or partially fused together with the layers located above and below.

DETAILED DESCRIPTION OF THE INVENTION

The task of the invention consists, in particular, in the manufacturing of laminates with excellent quality, which are mechanically very stable, preferably non-flammable laminates (heating value ≤3 MJ/kg, according to ISO 1716) in particular for their use both in intensively used interior areas and in the exterior areas. This task is solved with the multilayer structure of the laminates, which consists of several, but at least of four different layers. These layers, which can consist of several levels of textile surfaces, have respectively different functionalities, and in their entirety represent the concept of the invention. The outer layers give the ready laminate its extraordinarily high mechanical stability. The laminate core, in particular its chemical and physical structure, as well as the outer decorative layers, give the laminate its very high stability with respect to the changing external climatic conditions.

Figure 1:
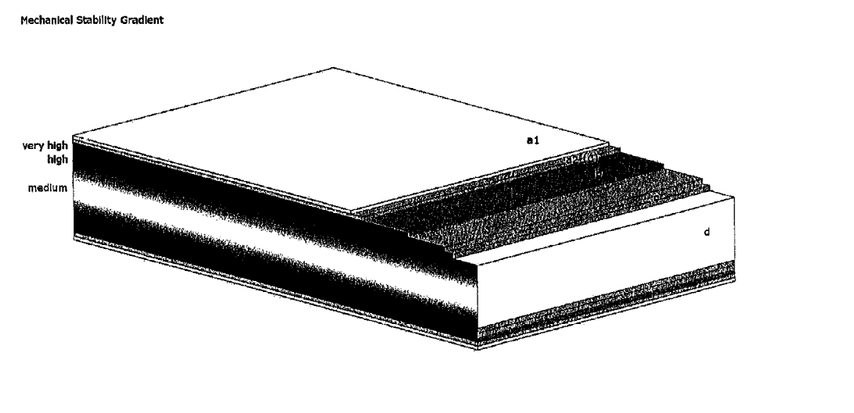

The basic structural variants of the laminate resp. laminate pre-products consist in a symmetric structure, as shown in FIG. 1, and in an asymmetric structure. FIG. 1 shows, by way of example, a symmetric structure with a central laminate core (layer d), two intermediate layers at both main surfaces of the laminate core, being each one of two stiffening layers (c) and two adhesive layers (b), as well as the outer decorative layers (a2). Optionally, in addition, protective layers (a1) can be placed over the decorative layers. In addition, optionally, two further adhesive layers (b) can be placed between the laminate core (d) and the stiffening layers (c) (not shown). In the case of asymmetric structure, the number of the individual layers and the layer structure on both main surfaces of the laminate core are different. In the extreme case, the layers on a main surface can also be completely absent. The mechanical strength of the represented laminate increases from the laminate core outwards.

From a laminate thickness of 2 mm on, adhesive layers can be added also in the laminate core for additional increase of the mechanical stability.

The stiffening layer and the adhesive layer, which build the intermediate layer, consist each of one, but preferably of several textile fabrics.

The individual layers resp. textile fabrics are pressed under the effect of pressure and temperature onto the ready laminate by using per se known methods. The manufacturing of the core layers is based on the method used in the prior art of core impregnation of the standard laminated hardboards; however, it deviates to a certain extent from this method in certain production steps. Deviations and modifications of the production method known from the prior art are described in details further below.

In the selection of the raw materials for the laminate according to the invention, it is necessary to make sure that a low heating value according to ISO 1716, preferably ≤3 MJ/kg, is achieved.

In the selection of the raw materials for the outer decorative layers of the laminate, as well as for the not essential internal layers as regards the mass, it must further be made sure that they have a low heating value according to ISO 1716, preferably ≤4 MJ/kg$^2$.

1. Definitions 1.1. Textile Surface

The textile fabrics used are all structures manufactured from fibers and from which a textile surface was produced by means of a surface-forming technology. The fiber-forming materials are preferably ceramic fibers, mineral fibers or glass fibers, wherein these ones can also be used in the form of mixtures and mixtures with polymeric fibers and filaments as well as natural fibers and carbon fibers. Textile surfaces are considered to be fabrics, scrims, knotted fabrics, knitted fabrics and non-woven fabrics, preferably non-woven fabrics.

The textile surfaces of mineral and ceramic fibers are aluminosilicate fibers, ceramic fibers, dolomite fibers, wollastonite fibers or fibers of vulcanites, preferably basalt fibers, diabase fibers and/or melaphyre fibers, especially basalt fibers. Diabases and melaphyres are designated collectively as paleobasalts and diabase is also often designated as greenstone.

1.2. B-Stage Binder

Some of the textile fabrics are provided with a B-stage binder. In order to ensure the required strengths in the further processing of the textile fabrics, they can also, additionally, be fitted with an additional standard binder (additional binder) (pre-consolidation). Chemically cross-linking and/or thermoplastic binders are suitable as additional binder.

The textile fabrics to be provided with the B-stage binder are optionally pre-strengthened with such an additional binder. The binders used can be the same or different but must be selected from the group of the binder systems compatible with the B-stage binder.

B-stage binders are understood to mean binders that are only partially consolidated or hardened, i.e. are available in the B-stage state, and can still experience a final consolidation, e.g., by thermal post-treatment. Such B-stage binders are described in detail in U.S. Pat. Nos. 5,837,620, 6,303,207 and 6,331,339. The B-stage binders disclosed therein are also an object of the present invention. B-stage binders are preferably binders based on furfuryl alcohol formaldehyde resins, phenol formaldehyde resins, melamine formaldehyde resins, urea formaldehyde resins and mixtures thereof. Preferably, these are aqueous systems. Further preferred binder systems are formaldehyde-free binders. B-stage binders are characterized in that they can be subjected to a multistage hardening, that is, they still have a sufficient binding action after the first hardening or after the first hardenings (B-stage state) so that they can be used for the further processing. Such binders are usually hardened in one step after the addition of a catalyst at temperatures of ca. 350° F.

In order to form the B-stage, such binders are optionally hardened after the addition of a catalyst. The amount of hardening catalyst is up to 10% by weight, preferably 0.1 to 5% by weight (based on the total binder content). For example, ammonium nitrate as well as organic aromatic acids, e.g., maleic acid and p-toluenesulfonic acid, are suitable as hardening catalyst since it allows the B-stage state to be reached quicker. In addition to ammonium nitrate, maleic acid and p-toluenesulfonic acid, all materials are suitable as hardening catalyst that have a comparable acidic function. In order to reach the B-stage, the textile surface structure impregnated with the binder is dried under the influence of temperature without producing a complete hardening. The necessary process parameters are dependent on the binder system selected.

The lower temperature limit can be influenced by the selection of the duration or by adding more or stronger acidic hardening catalysts.

The application of the B-stage binder to the textile fabric can take place by means of all known methods. In addition to spraying, impregnating and pressing, the binder can also be applied by coating or by means of rotary nozzle heads. Furthermore, foam application is also possible.

2. Laminate Core

The laminate core in the symmetric laminates consists of the internal core layers, and in the asymmetric laminates the one-side, usually outside lying, core layers (layers d in FIG. 1). Also asymmetric laminates with centrally positioned laminate core (not shown) are meaningful and have special properties.

The laminate core in the pre-product consists of several core layers, wherein mineral-based high filled textile fabrics with a very low resin content are used. In this context, special high-volume textile fabrics are used as carrier materials for manufacturing of the core layers. By using an impregnation method, these fabrics are impregnated with mineral-based highly filled, thermally hardening, natural or, preferably, modified synthetic resins (core formulation). The special structure of the used textile fabrics, the markedly low viscosity and the particularly high solids content of the impregnating formulation are favorable for an over-proportionally high level of binder assimilation of the textile fabrics. The filled fabrics obtained in this context are converted by controlled thermal treatment into a reactive transition state (B-stage state of the binder resin), which permits to store this intermediate product, also for many months, until its pressing to produce the actual laminate. The core layers resp. the laminate core show after this controlled thermal treatment residual water content of up to 8% by weight, preferably to 5% by weight. The laminate core in the pre-product preferably has at least 6 core layers, in particular at least 7 core layers. The upper limit for the number of core layers is based on the intended use resp. the purpose of use. Basically, this upper limit is not subject to any restriction, wherein, on practical grounds, an upper limit of up to 30 core layers was proven to be advantageous.

The determination of the residual water content is performed by taking samples and drying at 165° C. (drying oven) until reaching a constant weight of the sample. After the textile fabric is selected, it can disintegrate completely or partially in the course of the pressing of the laminate pre-product, i.e. the fibers, which build the textile fabric, are distributed in the matrix of mineral filler and the finally consolidated binder.

The pressing leads to the formation of a laminate core comprising
- 3-17% by weight of organic binder resin,
- 45-85% by weight of inorganic fillers and
- 10-25% by weight of inorganic and/or organic fibers, wherein the sum of the organic binder resin, the inorganic filler and the fibers is 100%.

The built laminate core has:
- a density of at least 1.70 g/cm$^3$, determined according to EN ISO 1183-1:2004, preferably of at least 1.80 g/cm$^3$,
- a bending strength of at least 35 MPa, determined according to EN ISO 178:2003, preferably of at least 45 MPa,
- a bending modulus of at least 7 MPa, determined according to EN ISO 178:2003, preferably of at least 8.5 MPa.

2.1. Structure of the Laminate Core in the Laminate Pre-Product and the Laminate Depending on the requirements to the finished laminate regarding its thickness, weight and mechanical strengths, the laminate core in the pre-product consists of 2-50, preferably 2-30 layers of the textile fabric surfaces filled with a core formulation, converted into B-stage and at least partially dried.

The laminate core in the pre-product preferably has at least 2 core layers, preferably at least 3 core layers, particularly preferably at least 6 core layers, in particular at least 7 core layers.

The upper limit for the number of core layers is based on the intended use resp. the purpose of use. Basically, this upper limit is not subject to any restriction, wherein, on practical grounds, an upper limit of up to 30 core layers was proven to be advantageous.

The mass ratio of the textile surface to the solids content from the core formulation is, preferably, from 1:3 to 1:9, particularly preferred from 1:4.5 to 1:6.

From a laminate thickness of 2 mm on, adhesive layers can be added also in the laminate core for additional increase of the mechanical stability.

In the selection of the raw materials for the laminate core, it is necessary to make sure that after its processing a low heating value according to ISO 1716, preferably ≤3 MJ/kg, is achieved for the entire laminate.

After the pressing of the laminate pre-product to produce a finished laminate, the above-described laminate core is present—as described above—in a modified form. The textile fabrics disintegrate completely or partially, i.e. the fibers, which build the textile fabrics, are distributed in the matrix.

2.2. Textile Surface (Core Layers)

The textile fabrics used for the laminate core resp. the laminate pre-product are preferably non-woven fabrics made of mineral fibers that are constructed from filaments, that is, continuous fibers or of staple resp. chopped fibers. The average length of the staple resp. chopped fibers in non-woven fabrics of mineral fibers used according to the invention is between 5 and 120 mm, preferably 10 to 90 mm. In a further embodiment of the invention, the non-woven fabric made of mineral fibers contains a mixture of endless fibers and staple resp. chopped fibers.

The average fiber diameter of the mineral fibers is between 5 and 30 µm, preferably between 8 and 24 µm, especially preferably between 8 and 15 µm.

In the case of the textile surfaces of glass fibers, non-woven fabrics are particularly preferred. These are constructed from filaments, that is, infinitely long fibers or of staple resp. chopped fibers. The average length of the staple resp. chopped fibers is between 5 and 120 mm, preferably 10 to 90 mm. In a further embodiment of the invention, the non-woven glass fiber fabric contains a mixture of endless fibers and staple resp. chopped fibers.

The average diameter of the glass fibers is between 5 and 30 µm, preferably between 8 and 24 µm, especially preferably between 10 and 21 µm.

Suitable glass fibers comprise those manufactured from A-glass, E-glass, S-glass, T-glass or R-glass.

The weight per unit area of the textile fabric is between 80 and 250 g/m², preferably 100 and 200 g/m², wherein these data refer to a fabric without a binder. The applied textile surface is consolidated with a chemical binder and usually holds 5% by weight-20% by weight of the chemical binder, preferably a completely cross-linked melamine or urea binder, in particular 7% by weight-15% by weight, wherein the specified value for the binder content is based on the total weight of the textile surface with the binder.

The porosity of the textile surface used is at least 500 l/m²sec, preferably 1000 l/m²sec -3000 l/m²sec. The porosity resp. air permeability of the textile surface s measured according to DIN EN ISO 9237.

The textile surface can be manufactured according to any known method. For glass non-woven fabrics, this is preferably the dry or wet laid method.

The above-mentioned preferred ranges for fiber length, fiber diameter, fiber weight, binder and porosity can be combined freely, independently of each other, and any possible combination of the respectively preferred ranges is thus explicitly part of the present description.

2.3. Core Formulation

The textile surfaces of the laminate core in the pre-product further contain thermally hardenable (reactive) resins, fillers, further additives and auxiliary materials (as a whole, called core formulation below).

The core formulation according to the invention is a mixture of basic substances described in detail below. The mixture can be produced with all known homogenization methods. The mass ratio of the individual raw materials of the core formulation is of decisive importance both for their workability in the production process and for their function and it is described in the following Table 1. The data in Table 1 are % by weight in relation to the overall formulation.

TABLE 1

| Constituents | Preferred content range | Particularly preferred content range |
| --- | --- | --- |
| Reactive basic resin | 2-15% | 8-12% |
| Inorganic fillers | 45-80% | 50-75% |
| Water (additional dilution) | 4-25% | 9-18% |
| Volatile impregnation auxiliary agents | 0-15% | 4-10% |
| Water retention agents | 0-6% | 0.2-3% |
| Inorganic pigments | 0-10% | |
| Hydrophobing agents | 0-15% | 0.2-4% |

The sum of the constituents indicated in Table 1 respectively amounts to 100%.

The preferred ranges for the respective ingredients can be combined freely, independently of each other, and any possible combination of the respective ingredients is thus explicitly part of the present description.

The physical data, which are relevant for the further processing of the core formulation (impregnation method, manufacturing of the laminate core), are described in the following Table 2. The data relating to the solid body are % by weight in relation to the overall core formulation.

TABLE 2

| Physical measure | Preferred range | Particularly preferred range |
| --- | --- | --- |
| Density | 1.3-2.0 g/cm³ | 1.4-1.8 g/cm³ |
| Solid bodies | 55-80% | 63-75% |
| Viscosity | 100-500 mPas | 120-200 mPas |

The preferred ranges for the thickness, viscosity and solids content, which are specified in Table 2, can be combined freely, independently of each other, and any possible combination of the ranges for the thickness, viscosity and solids content is thus explicitly part of the present description.

The core formulation according to the invention is characterized in that it has a particularly low viscosity of preferably 100-500 mPas, particularly preferably 120-200 mPas, measured at 25° C., and a solid body content of preferably 55-90% by weight, particularly preferably 63-75% by weight.

The low viscosity of the core formulation is decisive for its use in the process step of introduction into the non-woven fabric. The particularly high solids content is advantageous for the energy-efficient drying in the manufacturing of the laminate core.

The above-mentioned preferred ranges for ingredients, physical data of the core formulation and viscosity can be combined freely, independently of each other, and any possible combination of the respective preferred ranges is thus explicitly part of the present description 2.3.1. Reactive Basic Resins All thermally hardenable natural resp. synthetic resins and mixtures are in principle suitable as reactive basic resins for the core layers. Preferred are synthetic resins from the group of the duroplastic interlinked systems, and also the use of combinations of several different resin systems is meaningful.

In particular phenol formaldehyde resins, melamine formaldehyde resins, urea formaldehyde resins and also the mixtures thereof can be used as binding agents. Particularly preferred are low-condensation alkaline catalyzed aqueous phenolresols and their mixtures with nitrogen-containing formaldehyde-based resins.

The used phenolresols are distinguished from the other possible binding agents by their distinct hydrophobic behaviour in the hardened state. This property provides an advantageous contribution to the extraordinarily high stability of the laminate according to the invention under changing climatic conditions, in particular with respect to the humidity.

The molar ratio of the phenol to the formaldehyde in the resins used according to the invention is preferably from 1:1 to 1:2.5; particularly preferred from 1:1.4 to 1:2. Amines, alkali and alcaline earth hydroxides are used as catalysts. Sodium hydroxide is preferably used. The catalyst concentration lies between 5 and 200 mmol/mol of phenol, preferably between 10 and 60 mmol/mol of phenol.

The phenol resins used according to the invention are aqueous or aqueous-methanolic systems with a solid resin content of 35-80%, preferably with 45-70%. The methanol content lies at 0-20%, preferably at 5-15%. The water content lies at 20-65%, preferably at 25-40%. The water dilution level of the resins used is from 1:0.5 to 1:4, preferably between 1:0.8 and 1:2 in mass parts. The viscosity of the basic resins is 50-2000 mPas, preferably at 100-300 mPas, measured with a Brookfeld spindle rheometer at 25° C.

The aforementioned preferred ranges for the basic resins can be combined freely, independently of each other, and any possible combination of the respectively preferred ranges is thus explicitly part of the present description.

2.3.2. Fillers

All non-flammable inorganic filler materials can be used as fillers, wherein the grain size distribution must be selected in such a way that the integration in the binding agent system as well in the textile fabrics to be impregnated is ensured. Suitable filler materials are, in particular, mineral fillers, preferably all alcaline earth carbonates in their different natural and synthetic forms, magnesium hydroxide, aluminium hydroxide, kaolin, talc, titanium dioxide, all synthetically manufactured and naturally existing silicates and their mixtures.

Preferred fillers are naturally available calcium carbonates with an average particle diameter of between 1 and 100 μm, particularly preferably between 2 and 20 μm. Naturally available chalks are particularly preferred. Based on their particle geometry (soft agglomerated rounded particles with a primary crystallite size of 1 μm), chalks are particularly suitable for obtaining low-viscose formulations also in the case of high filler contents. The viscosity of the core formulations is thus particularly positively influenced and, also at filler contents >75%, low-viscose, easily impregnable core formulations are obtained, which is essential for the laminate according to the invention and particularly for the manufacturing process for the laminate core. This special property of the core formulation permits its integration into the described textile fabrics, in particular non-woven fabrics, at high manufacturing speeds.

The aforementioned preferred ranges for the fillers can be combined freely, independently of each other, and any possible combination of the respectively preferred ranges is thus explicitly part of the present description.

2.3.3. Additives

Water and all solvents that can be mixed with water, in particular alcohols, are suitable for use as dilution media. Here, it is advantageous when the solvents, which can be mixed with water, have a vapor pressure at 20° C., which is greater than the one of the water.

Water and methanol are particularly preferred as dilution media. Preferred and particularly preferred contents of these substances are described in Table 1 under the heading "Water" and "Volatile impregnation auxiliary agents".

Similar substances, such as the ones used also in the paper industry for the manufacturing of coating paints, are suitable for use as auxiliary additives for the retention of liquids and penetration of non-woven fabrics. Preferred are synthetically manufactured polar polymers as well as modified natural polymers based on celluloses and starches and their aqueous solutions, as well as bentonite. Aqueous solutions of low molecular carboxymethylcellulose are particularly preferred. The preferred and the particularly preferred contents of these substances are described in Table 1 under the heading "Water retention agents".

Hydrophobization agents can be used as auxiliary materials for additional improvement of the stability to humidity of the laminate core. The term hydrophobization agents according to the invention includes all natural and synthetically manufactured compounds, which give the end product (laminate core) distinct apolar and hydrophobic properties. Preferably used hydrophobization agents are ramified and non-ramified, fluorinated and non-fluorinated long-chain paraffin-like hydrocarbons, fats, oils, waxes, silicone resins. All above-mentioned compounds can be used according to the invention in their pure form as well as in the form of suspensions or emulsions in water and also as mixtures. Silicone resins are particularly preferred for additional hydrophobization of the laminate core. Preferred and particularly preferred contents of these auxiliary materials are described in Table 1 under the heading "Hydrophobization agents".

Pigments and paints of any kind can be used for coloring the laminate core. The coloring of the laminate core brings the advantage that any damage on the laminate edges by intentional (sawing, milling) and unintentional mechanical stress (impact load) is optically less noticeable and the laminate continues to show excellent optical quality. Preferred are metal oxide pigments used for coloring the core, iron oxide pigments being particularly preferred. Preferred and particularly preferred contents of these auxiliary materials are described in Table 1 under the heading "Inorganic pigments".

The aforementioned preferred ranges for the additives can be combined freely, independently of each other, and any possible combination of the respectively preferred ranges is thus explicitly part of the present description.

2.3.4. Impregnation Method

For introduction of the core formulation into the textile fabric, all known methods of the prior art can be used. Particularly suitable is the impregnation of the textile fabrics in the core formulation by their immersion and the subsequent removal of the excess core formulation by means of a roller or a squeegee dosing unit, as it is known from the prior art in the paper impregnation in the manufacturing of laminated hardboards in horizontal or vertical impregnation systems. In this way, the precise adjustment of the end weight of the core layer as well as the precise weight ratios between the textile fabrics and the core formulation are possible in an easy manner. The composition of the laminate core is adjusted in such a way that a sufficient and uniform penetration of the textile fabric is achieved. Furthermore, the ratio of the flammable and non-flammable substances in the laminate core is determined in a way to achieve a very low heating value according to ISO 1716, preferably ≤3 MJ/kg The drying of the textile fabric impinged with the core material takes place by using the customary methods by controlled thermal treatment. In this context, as in the process of core paper impregnation of the laminated hardboards, the binding agent is only partially integrated and thus passes in a reactive transition state, which permits to store this intermediate product also for several months until the pressing to produce the actual laminate.

The precise adjustment of the reactivity of the transition state is performed by measuring the parameters mass application formulation, residual humidity content, pressing/flux, which are taken from the prior art of the manufacturing of laminated hardboards. The core layers resp. the laminate core show after this controlled thermal treatment residual water content of up to 8% by weight, preferably up to 5% by weight. The determination of the residual water content is performed by taking samples and drying at 165° C. (drying oven) until reaching a constant weight of the sample.

3. Stiffening Layer

The term stiffening layer designates the textile surfaces, which are located on both side of the laminate core (for symmetric laminates) resp. on one side of the laminate core (asymmetric laminates) (FIG. 1, c). This layer consists of special textile surfaces with limited resin coating, which serve for levelling the irregular structures from the interior of the laminate and radically increase the strength and the mechanical values of the laminate. For the stiffening layer, binders are used which can be brought to a B-stage.

3.1. Textile Surface (Stiffening Layer of the Intermediate Layer)

The textile fabrics used for the stiffening layer available in the intermediate layer are preferably non-woven fabrics, in particular non-woven fabrics made of mineral fibers that are constructed from filaments, that is, continuous fibers or of staple resp. chopped fibers. The average length of the staple resp. chopped fibers in the non-woven fabric of mineral fibers used according to the invention is between 5 and 120 mm, preferably 10 to 90 mm. In a further embodiment of the invention, the non-woven fabric made of mineral fibers contains a mixture of endless fibers and staple resp. chopped fibers.

The textile fabric for the stiffening layer, in particular the non-woven fabrics, can also comprise mixtures with organic, polymeric fibers and filaments, natural fibers and/or carbon fibers.

The average fiber diameter of the mineral fibers is between 5 and 30 µm, preferably between 8 and 24 µm, especially preferably between 8 and 15 µm.

In the case of the textile surfaces of glass fibers, non-woven fabrics are particularly preferred. These are constructed from filaments, that is, continuous fibers (endless fibers) or of staple resp. chopped fibers. The average length of the staple resp. chopped fibers is between 5 and 120 mm, preferably 10 to 90 mm. In a further embodiment of the invention, the non-woven glass fiber fabric contains a mixture of endless fibers and staple resp. chopped fibers.

The average diameter of the glass fibers is between 5 and 30 µm, preferably between 8 and 24 µm, especially preferably between 10 and 21 µm.

Suitable glass fibers comprise those manufactured from A-glass, E-glass, S-glass, T-glass or R-glass.

Optionally, the textile surface contains additional reinforcement for increasing the strength and the mechanical properties. It is preferred that this reinforcement is reinforcement of the longitudinal threads or reinforcement of the core, i.e. the reinforcement threads are brought into the textile surface. It is preferred that the reinforcement threads are glass filaments or glass fiber rovings, which are brought into the textile surface as a parallel yarn sheet or in the form of a glass fiber scrim.

The weight per unit area of the textile fabric for the stiffening layer is between 140 and 600 g/m², preferably 200 and 300 g/m², wherein these data refer to a fabric without a B-stage binder. The textile surface contains 5% by weight –30% by weight of a B-stage binder, preferably 15% by weight –25% by weight, wherein the specified value for the binder content is related to the total weight of the textile surface with the binder and after the transition in the B-stage state.

The above-mentioned preferred ranges for fiber length, fiber diameter, weight per unit surface area and binder application can be combined freely, independently of each other, and any possible combination of the respectively preferred ranges is thus explicitly part of the present description.

3.2. B-Stage Binder

The textile fabrics for the stiffening layers are provided with a B-stage binder. The textile surface (stiffening) preferably contains no additional binder. Optionally, the textile surface can contain a maximum of 5% by weight of an additional binder.

The textile surface structure used for the stiffening layers in the laminate pre-product preferably has at least one binder in the B-stage state, which is finally consolidated in the finished laminate.

The weight per unit area of the textile fabric for the stiffening layer is between 140 and 600 g/m², preferably 200 and 300 g/m², wherein these data refer to a fabric without a B-stage binder. The textile surface contains 5% by weight –30% by weight of a B-stage binder, preferably 15% by weight –25% by weight, wherein the specified value for the binder content is related to the total weight of the textile surface with the binder and after the transition in the B-stage state.

The textile surface can be manufactured according to any known method. For glass non-woven fabrics, this is preferably the dry or wet laid method.

4. Adhesive Layer in the Intermediate Layer

As adhesive layer in the intermediate layer are the textile surfaces designated, which are located on or under the above-mentioned protective layers (FIG. 1). These layers consist of special textile surfaces, which are highly resinated and serve as adhesion promoters between the outer laminate layers and the layers that lie further inside. An essential function of these layers is the levelling of structural irregularities from the inside of the laminate, so that they could not penetrate into the laminate surface and affect the surface. In addition, these layers provide an essential contribution to the strength of the entire laminate, help for improving the mechanical characteristics and the load-bearing capacity of the laminate and provide protection from humidity for the deeper inner layers. The textile surfaces of the adhesive layer contain B-stage binders. In the laminate pre-product it is in a B-stage state and in the finished laminate it is finally consolidated. Due to the dynamic flow behaviour of the binder during the lamination, the adhesive layer creates binder gradients in the structural element. Thereby, an improved binding of the individual laminate layers to their boundary surfaces is obtained and thus excellent mechanical properties of the laminate are achieved.

4.1. Textile Surface (Adhesive Layer of the Intermediate Layer)

The textile fabrics used for the adhesive layer available in the intermediate layer are preferably non-woven fabrics, in particular non-woven fabrics made of mineral fibers that are constructed from filaments, that is, continuous fibers or of staple resp. chopped fibers. The average length of the staple resp. chopped fibers in the non-woven fabric of mineral fibers used according to the invention is between 5 and 120 mm, preferably 10 to 90 mm. In a further embodiment of the invention, the non-woven fabric made of mineral fibers contains a mixture of endless fibers and staple resp. chopped fibers.

The average fiber diameter of the mineral fibers is between 5 and 30 µm, preferably between 8 and 24 µm, especially preferably between 8 and 15 µm.

The textile fabric for the adhesive layer, in particular the non-woven fabrics, can also comprise mixtures with organic, polymeric fibers and filaments, natural fibers and/or carbon fibers.

In the case of the textile surfaces of glass fibers, non-woven fabrics are particularly preferred. These are constructed from filaments, that is, infinitely long fibers or of staple resp. chopped fibers. The average length of the staple resp. chopped fibers is between 5 and 120 mm, preferably 10 to 90 mm. In a further embodiment of the invention, the non-woven glass fiber fabric contains a mixture of endless fibers and staple resp. chopped fibers.

The average diameter of the glass fibers is between 5 and 30 µm, preferably between 8 and 24 µm, especially preferably between 10 and 21 µm.

Suitable glass fibers comprise those manufactured from A-glass, E-glass, S-glass, T-glass or R-glass.

The weight per unit area of the textile fabric for the adhesive layer is between 25 and 500 g/m$^2$, preferably 30 and 70 g/m$^2$, wherein these data refer to a fabric without a B-stage binder but with the, if applicable, available additional binder. The textile surface contains 40% by weight-80% by weight of a B-stage binder, preferably 50% by weight-65% by weight, wherein the specified value for the binder content is related to the total weight of the textile surface with the binder and after the transition in the B-stage state.

The above-mentioned preferred ranges for fiber length, fiber diameter, weight per unit surface area and binder application can be combined freely, independently of each other, and any possible combination of the respectively preferred ranges is thus explicitly part of the present description.

4.2. B-Stage Binder (Adhesive Layer)

The textile fabrics for the adhesive layers are provided with a B-stage binder. In order to ensure the required strengths in the further processing of the textile fabrics, they are preferably fitted with an additional standard binder for pre-consolidation. The additional binder content (additional binders) is at most 35% by weight, preferably 7 to 27% by weight, wherein these data only refer to the total weight of the textile surface without a binder.

The textile surface structure used for the stiffening layers in the laminate pre-product preferably has at least one binder in the B-stage state, which is finally consolidated in the finished laminate.

The weight per unit area of the textile fabric for the adhesive layer is between 25 and 500 g/m$^2$, preferably 30 and 70 g/m$^2$, wherein these data refer to a fabric without a B-stage binder but with the, if applicable, available additional binder. The textile surface contains 40% by weight-80% by weight of a B-stage binder, preferably 50% by weight-65% by weight, wherein the specified value for the binder content is related to the total weight of the textile surface with the binder and after the transition in the B-stage state.

Preferably, the total area weight (sum of individual textile surfaces) of the textile surfaces used for the adhesive layer is lower by at least 20% than the total area weight of the textile fabrics used for the stiffening layer.

The textile surface can be manufactured according to any known method. For glass non-woven fabrics, this is preferably the dry or wet laid method. Due to the better surface quality, the wet laid method is preferred.

Depending on the requirement to the laminate with respect to the mechanical requirements, the adhesive layer consists of 1-2 layers of textile surfaces, respectively, on the surface of the stiffening layer (i.e. in the case of symmetric structure 2-4 layers).

5. Decorative Layer

The outer layers (a2 in FIG. 1) serve for optimization of the surfaces, including the surface quality and the color design. In this context, all kinds of papers impregnated with natural and synthetic resin and all kinds of textile fabrics (non-woven fabrics, tissues) can be used as utmost outer layers (a2 in FIG. 1). As regards the papers, in particular kraft papers, decorative papers, basic printing papers, overlay papers, silk papers, cotton papers or recycling papers can be used. Furthermore, the decorative layer can contain certain functional materials, which can comprise also optical special effects.

In the selection of the raw materials for decorative outer layers of the laminates, it must be kept in mind that they prefer a low heating value according to ISO 1716, preferably ≤4 MJ/m$^2$.

5.1. Decorative Papers

In a preferred embodiment, absorptive decorative papers are used. Such decorative papers are known in the prior art from the manufacturing of laminated hardboards and are either single-colored or are provided with decorative prints. The weight per unit area of the decorative paper is between 25 and 140 g/m2, preferably between 60 and 120 g/m$^2$. The high absorptive capacity is necessary for a quick and regular soaking capability through the B-stage binders used for that.

5.2. Textile Fabric (Decor)

In another preferred embodiment, textile fabrics are used for the decorative layer, in particular tissues or non-woven fabrics.

In a preferred embodiment, the decorative layer is a mineral or non-woven glass fiber fabrics. The non-woven fabric made of mineral fibers can be constructed from filaments, that is, continuous fibers or of staple resp. chopped fibers. The average length of the staple resp. chopped fibers in the non-woven fabric of mineral fibers used according to the invention is between 5 and 120 mm, preferably 10 to 90 mm. In a further embodiment of the invention, the non-woven fabric made of mineral fibers contains a mixture of endless fibers and staple resp. chopped fibers.

The average fiber diameter of the mineral fibers is between 5 and 30 µm, preferably between 8 and 24 µm, especially preferably between 8 and 15 µm.

In the case of the textile surfaces of glass fibers, non-woven fabrics are particularly preferred. These are constructed from filaments, that is, infinitely long fibers or of staple resp. chopped fibers. The average length of the staple resp. chopped fibers is between 5 and 120 mm, preferably 10 to 90 mm. In a further embodiment of the invention, the non-woven glass fiber fabric contains a mixture of endless fibers and staple resp. chopped fibers.

The average diameter of the glass fibers is between 5 and 30 µm, preferably between 8 and 24 µm, especially preferably between 10 and 21 µm.

Suitable glass fibers comprise those manufactured from A-glass, E-glass, S-glass, T-glass or R-glass.

The textile surfaces from mineral and/or glass fibers, in particular the non-woven fabrics from these materials, can be also printed. The printing of the textile surface may proceed by known methods.

The textile fabric for the decorative layer, in particular the non-woven fabrics, can also comprise mixtures with organic, polymeric fibers and filaments, natural fibers and/or carbon fibers.

5.3. B-Stage Binder Decorative Papers

All binder agents and hardening systems known from the prior art for the manufacturing of laminated hardboards can be used as B-stage binders for decorative papers.

5.4. B-Stage Binder Decor—Further Textile Fabrics

The textile fabrics for the decorative layer are provided with a B-stage binder. In order to ensure the required strengths in the further processing of the textile fabrics, they are preferably fitted with an additional binder. The additional binder content (additional binders) is at most 30% by weight, preferably 7 to 27% by weight.

The textile surface structure used for the decorative layer in the laminate pre-product preferably has at least one binder in the B-stage state, which is finally consolidated in the finished laminate.

The weight per unit area of the textile fabric for the decorative layer is between 30 and 250 g/m², preferably 40 and 70 g/m², wherein these data refer to a fabric without a B-stage binder but with the, if applicable, available additional binder. The textile surface contains 30% by weight-70% by weight of a B-stage binder, preferably 50% by weight-60% by weight, wherein the specified value for the binder content is related to the total weight of the textile surface with the binder.

The textile surface can be manufactured according to any known method. For glass non-woven fabrics, this is preferably the dry or wet laid method.

5.5. Functional Materials (Decor)

In addition to the previously cited features, the decorative layer according to the invention can include even further finishings with functional materials. To this end, a functional material applied to the top of the textile fabric equipped with the B-stage binder or introduced into the textile fabric is used.

The functional materials used according to the invention are flame retardants, materials for controlling electrostatic charges, materials for shielding electromagnetic radiation, materials for increasing the abrasion resistance and surface hardness, but in particular organic or inorganic pigments, especially colored pigments, effect pigments or electrically conductive pigments or particles.

In a variant of the method, an additional binder is added to fix the functional materials on the textile surface structure. In this connection, the same binder (B-stage binder) as is present in the textile fabric is preferably chosen. The content of functional materials is determined by the subsequent use.

The flame retardants are inorganic flame retardants, organophosphorus flame retardants, nitrogen-based flame retardants or intumescence flame retardants. Halogenated (brominated and chlorinated) flame retardants can also be used but are less preferred on account of their risk evaluation. Examples for such halogenated flame retardants are polybrominated diphenyl ethers, e.g., decaBDE, tetrabromobisphenol A and HBCD (hexabromocyclododecane).

The materials for shielding electromagnetic radiation are usually electrically conductive materials. They can be built in the form of foils, particles, fibers resp. wires and/or textile fabrics from the above-mentioned materials.

Antistatic effects can be achieved and/or the properties for the powder lacquering can be adjusted by the use of agents for raising or controlling the electrical conductivity. These agents are customarily particles that are electrically conductive. Suitable materials are electrically conductive carbons, such as carbon black, graphite and carbon nanotubes (C nanotubes), conductive plastics or fibers or particles of metal or metallic components. In addition to these, conductive organic resins, such as phenol resins, or inorganic or organic salts can also be used. Such additives are already known from DE-A-3639816. Furthermore, the salts disclosed in DE-A-10232874 and EP-A-1659146, especially alkali or alkaline earth salts, such as lithium nitrate and sodium nitrate, can also be used. However, the previously cited materials should be compatible with the other materials.

The use of agents for raising and/or controlling the electrical conductivity reduces the surface resistance of the composite material according to the invention. It turned out that composite materials according to the invention with a surface resistance of up to $10^{10}\Omega$ (ohms), preferably up to $10^8\Omega$ (ohms) are very well suited for powder lacquerings.

To increase the abrasiveness and scratch resistance, SiC and/or $SiO_2$ particles or similar materials are preferably used. For the surface finish to improve the abrasion and hardness, grain sizes of less than 1 mm are typically used by which a very hard surface can be produced.

The portion of the functional materials in the decorative layer is 0% by weight-15% by weight, preferably 1% by weight-15% by weight related to the total weight of the textile fabrics.

5.6. Alternative Decorative Functions

In another preferred embodiment, the adhesive layer according to the invention can have also equipments with functional materials. To this end, a functional material applied to the top of the textile fabric equipped with the B-stage binder or introduced into the textile fabric is used.

The functional materials used according to the invention are in particular flame retardants, materials for controlling electrostatic charges, but also the above-mentioned flame retardants, materials for shielding electromagnetic radiation, materials for increasing the surface hardness and pigments can in principle be used.

In a variant of the method, an additional binder is added to fix the functional materials on the textile surface structure. In this connection, the same binder (B-stage binder) as is present in the textile surface structure is preferably chosen. The content of functional materials is determined by the subsequent use.

The inclusion of functional materials in the adhesive layer can improve the characteristics and the effects of the outer decorative layer. In particular, when using agents for increasing resp. controlling the electrical conductivity in the adhesive layer, powder lacquering can occur directly onto the adhesive layer. In this case, the decorative layer is applied onto the powder-lacquer.

In another preferred embodiment form, a powder lacquer is deposited directly over the adhesive layer and the separate outer decorative layer can be partially or completely dropped. In this case, the adhesive layer assumes partially or completely the function of the decorative layer.

5.7. Protective Layer

Depending on the area of use of the finished product, the outmost layer can optionally be coated additionally with different protective layers (FIG. 1, layer a1). Particularly suitable as protective layers are both radiation-hardening and thermally hardening systems such as those described in WO97/49746. As a chemical basis for these protective layers, polucondenser, polyaddition and polymerisation systems can be used, polymerisation systems being preferred. The provision of these additional coatings lead to particularly high-quality products which are suitable, in particular, for outside areas exposed to the action of the sun, wind and weather conditions. These products are distinguished by their excellent weathering stability and extremely low sensitivity to humidity of the decorative surfaces.

In the selection of the raw materials for the described protective layer, it is necessary to make sure that their heating value according to ISO 1716 is low and is preferably ≤4 $MJ/m^2$ and that for the entire laminate a low heating value of preferably ≤3 MJ/kg according to ISO 1716 is achieved.

5.8. Calming Layer

In a further preferred embodiment of the invention, it can, if applicable, have at least one calming layer, which is arranged on the side of the decorative layer facing the laminate core.

The textile fabrics used for the calming layer are preferably non-woven fabrics, in particular non-woven fabrics made of mineral fibers that are constructed from filaments, that is, continuous fibers or of staple resp. chopped fibers. The average length of the staple resp. chopped fibers in the non-woven fabric of mineral fibers used according to the invention is between 5 and 120 mm, preferably 10 to 90 mm. In a further embodiment of the invention, the non-woven fabric made of mineral fibers contains a mixture of endless fibers and staple resp. chopped fibers.

The average fiber diameter of the mineral fibers is between 5 and 30 μm, preferably between 8 and 24 μm, especially preferably between 8 and 15 μm.

The textile fabric for the calming layer, in particular the non-woven fabrics, can also comprise mixtures with organic, polymeric fibers and filaments, natural fibers and/or carbon fibers.

In the case of the textile surfaces of glass fibers, non-woven fabrics are particularly preferred. These are constructed from filaments, that is, infinitely long fibers or of staple resp. chopped fibers. The average length of the staple resp. chopped fibers is between 5 and 120 mm, preferably 10 to 90 mm. In a further embodiment of the invention, the non-woven glass fiber fabric contains a mixture of endless fibers and staple resp. chopped fibers.

The average diameter of the glass fibers is between 5 and 30 μm, preferably between 8 and 24 μm, especially preferably between 10 and 21 μm.

Suitable glass fibers comprise those manufactured from A-glass, E-glass, S-glass, T-glass or R-glass.

The weight per unit area of the textile fabric for the calming layer is between 25 and 500 $g/m^2$, preferably 30 and 70 $g/m^2$, wherein these data refer to a fabric with a binder. The textile surface contains 10% by weight-50% by weight of a given binder, preferably 15% by weight-25% by weight, wherein the specified value for the binder content is related to the total weight of the textile surface with binder.

The above-mentioned preferred ranges for fiber length, fiber diameter, weight per unit surface area and binder application can be combined freely, independently of each other, and any possible combination of the respectively preferred ranges is thus explicitly part of the present description.

The present invention was described above in details and the preferred embodiments were discussed. The preferred ranges for the above-mentioned textile surfaces of the core layers, the intermediate layer comprising the adhesive layer and the stiffening layer, the B-stage binders, the laminate core, the decorative layer, the calming layer and the protective layer can be combined freely, independently of each other, and any possible combination of the respectively preferred ranges or the implementation form is thus explicitly part of the present description.

6. Manufacturing Process

The flame-resistant laminate according to the invention is manufactured by pressing the above-described individual layers in the above-described structural variants.

The pressing of all layers of the laminate pre-product (FIG. 1, layers a-d) can take place both in single and preferably multi-platen presses, as this is known from the prior art of laminate production, preferably as for the HPL (high pressure laminates), i.e. at least at 120° C. and at least at 5 MPa. The pressures and temperatures to be applied are within the ranges usually set up for the technical and the decorative laminates. Here also, the final consolidation of the binders present in a B-stage state takes place.

According to the invention, the above-described special properties of the laminate are achieved by means of this multilayer structure and, in particular, through its stabilizing outer layers. The monolithic structure (the layers, which are lying first onto each other, are melted and bonded to form an inseparably bonded system), which is obtained after the manufacturing (pressing under high pressure and temperature), has in its outer areas higher strength than the laminate core, wherein this is to be understood as a gradient of the mechanical values from the outside (higher) towards the inside (lower). Functionally, this can be compared to a steel double T beam, which gains its stability from a similar special construction.

FIG. 1 shows in addition the strength characteristics within the finished laminate. The results were obtained by comparative measurements of different laminate structures (with and without reinforcement and stiffening layers) and show clearly the higher strength in the outer laminate areas. This strength gradient in the laminate manufactured according to the invention is an essential advantage of the invention.

After the pressing of the individual layers, a monolithic material with a strength gradient from outside (decorative side) towards inside (core side) is obtained.

Furthermore, thanks to this special structure, the penetration of humidity through the outer surface of the laminate into the core is prevented. This results in panels with enhanced resistance to humidity.

Furthermore, the laminates according to the invention exhibit a particularly good bending strength of preferably at least 40 MPa, in particular of at least 45 MPa, particularly preferably of at least 50 MPa, in particular preferably at least 55 MPa, determined according to EN ISO 178:2003 (transverse direction).

In addition, the laminates according to the invention show a particularly good bending modulus of at least 8.5 MPa, in particular preferably at least 9 GPa, determined according to EN ISO 178:2003 (transverse direction).

Furthermore, thanks to this special structure, a particularly high-value, optically appealing laminate surface is obtained, which is clearly distinguished from the surfaces obtained with the prior art.

7. Use

The laminate manufactured out of the laminate preproduct according to the invention are suitable for producing surfaces inside or outside of buildings.

The increasing tightening of the regulations regarding fire prevention restricts noticeably the areas of application of the flammable construction materials, in particular in outside applications. The slow-moving progress in the harmonization of the construction regulations requires, in addition, tightening the safety regulations. For the siding of facades of buildings, whose height exceeds the limit of the high-rise buildings, in most countries non-inflammable construction materials are prescribed. That is why these buildings are mostly constructed with facade elements made of glass, metal or stone. Architects increasingly require stronger facade elements with natural surfaces, e.g. such as those made of laminated hardboards, in order to be able to offer an alternative. The laminated hardboards are implemented for siding of buildings as suspended, ventilated facades. In this context, the thermal insulation is separated from the actual facade siding by an air gap, which guarantees the continuous leading away of humidity in the ventilation gap. Therefore, the humidity can escape freely from the building, the insulation remains dry and functional, the mould formation is prevented.

In the inside area, the regulations for the wall covering in hospitals, nursing homes, schools, public buildings, airports, and particularly in the escape routes, have been tightened. The goal is to guarantee, in the case of fire, the full evacuation of the building, even when, as in the case, for example, of hospitals, a longer evacuation time is expected. Also here, however, the design trend moves away from sterile concrete and glass surfaces and shifts towards natural or individual surfaces. The laminated hardboards offer also here exactly this freedom of design, but until now their flammability excludes their use in the above-mentioned areas. The present invention provides remedy here by making available the necessary laminated hardboards. It is possible to combine the desire for design diversity of the laminated hardboards with the fire properties of A2 materials. The mounting takes place here also with rear ventilation. Particularly in the rehabilitation of older buildings, the necessary ventilation of the masonry, as required from the bio-constructional point of view is ensured. In addition, this type of mounting permits a simple way for compensating the unevenesses and allows the installation of a durable, easy to maintain and hygienic wall covering.

EXAMPLES

The invention is substantiated by the following examples without limiting them:

Example 1

Decorative Panel Thermopal Flameprotect Compact (Product of the Company Thermopal GmbH) Laboratory Sample, Single-Colored White, 6.50 mm (Comparative Example)

Non-flammable panel with decorative layers on both sides, designed for interior use. Core structure optically homogeneous, light.

Example 2

Core Plate without Hydrophobization, without Decoration

Structure: $8d$ layers (core only).

8 core layers from textile fabric according to the invention, impregnated with core formulation according to the invention (0% hydrophobization, filler: $CaCO_3$, binding agent phenol-formaldehyde resin. Solid body resin:filler ratio=1:10.5, auxiliary material: carboxymethylcellulose, impregnation auxiliary agent: water, methanol)

Example 3

Panel with Decorative Layers on Both Sides According to the Invention with Strength Gradient for Interior Use Structure: Symmetric structure, 8 core layers ($8d$), in each case a supportive layer (c), in each case an adhesive layer (b) and in each case a decorative layer (a2); overall structure a2,b,c,$8d$,c,b,a2.

Single-color decorative paper impregnated with melamine-formaldehyde resin with a weight per unit area of 90 g/m$^2$, adhesive non-woven according to the invention, reinforcement non-woven according to the invention, 8 core layers from the textile fabric according to the invention impregnated with the core formulation according to the invention (0% hydrophobization, filler: $CaCO_3$, binding agent phenol-formaldehyde resin, solid body resin:filler ratio=1:10.5, auxiliary material: carboxymethylcellulose, auxiliary impregnation agent: water, methanol), reinforcement non-woven according to the invention, adhesive non-woven according to the invention, single-color decorative paper impregnated with melamine-formaldehyde resin with a weight per unit area of 90 g/m$^2$.

Example 4

Panel with Decorative Layers on Both Sides According to the Invention with a Strength Gradient for Exterior Use Structure: Symmetric structure, 8 core layers ($8d$), in each case an adhesive layer (b), in each case a stiffening layer (c), in each case a decorative layer (a2) and in each case a protective layer (a1); overall structure a1,a2,b,c,$8d$,c,ba2,a1

Weathering-stable polyurethanacrylate coating, printed decorative paper impregnated with melamine-formaldehyde resin with a weight per unit area of 80 g/m$^2$, adhesive non-woven according to the invention, reinforcement non-woven according to the invention, 8 core layers from the textile fabric according to the invention impregnated with the core formulation according to the invention (0% hydrophobization, filler: $CaCO_3$, binding agent phenol-formaldehyde resin, solid body resin:filler ratio=1:10.5, auxiliary material: carboxymethylcellulose, auxiliary impregnation agent: water, methanol), reinforcement non-woven according to the invention, adhesive non-woven according to the invention, single-color decorative paper impregnated with melamine-formaldehyde resin with a weight per unit area of 80 g/m$^2$, weathering-stable polyurethanacrylate coating.

Example 5

Core Plate with Hydrophobization without Decor

Structure: 8d layers.

8 core layers from textile fabric according to the invention impregnated with the core formulation according to the invention (2% hydrophobic agent on polysiloxane basis, filler: $CaCO_3$, binding agent phenol-formaldehyde resin, solid body resin:filler ratio=1:10, auxiliary material: carboxymethylcellulose, auxiliary impregnation agent: water, methanol).

Example 6

Panel with Decorative Layers on Both Sides According to the Invention with a Strength Gradient for Exterior Use, High Resistance to Humidity Structure: Symmetric structure, 8 core layers (8d), in each case an adhesive layer (b), in each case a stiffening layer (c), in each case a decorative layer (a2) and in each case a protective layer (a1); overall structure a1,a2,b,c,8d,c,b,a2,a1

Weathering-stable polyurethanacrylate coating, printed decorative paper impregnated with melamine-formaldehyde resin with a weight per unit area of 80 g/m², adhesive non-woven according to the invention, reinforcement non-woven according to the invention, 8 core layers from the textile fabric according to the invention impregnated with the core formulation according to the invention (2% hydrophobing agent, filler: $CaCO_3$, binding agent phenol-formaldehyde resin, solid body resin:filler ratio=1:10, auxiliary material: carboxymethylcellulose, auxiliary impregnation agent:water, methanol), reinforcement non-woven according to the invention, adhesive non-woven according to the invention, single-color decorative paper impregnated with melamine-formaldehyde resin with a weight per unit area of 80 g/m², weathering-stable polyurethanacrylate coating

Example 7

Panel with Decorative Layers on Both Sides According to the Invention with a Strength Gradient for Exterior Use, High Resistance to Humidity, Including a Calming Non-Woven Structure: Symmetric structure, 11 core layers (11d), in each case an adhesive layer (b), in each case a stiffening layer (c), in each case a calming non-woven (e), in each case a decorative layer (a2) and in each case a protective layer (a1); overall structure a1,a2,e,b,c, 11d,c,b,e, a2,a1

Weathering-stable polyurethanacrylate coating, printed decorative paper impregnated with melamine-formaldehyde resin with a weight per unit area of 80 g/m², calming non-woven according to the invention, adhesive non-woven according to the invention, reinforcement non-woven according to the invention, 11 core layers from the textile fabric according to the invention impregnated with the core formulation according to the invention (2% hydrophobing agent, filler: $CaCO_3$, binding agent phenol-formaldehyde resin, solid body resin:filler ratio=1:10, auxiliary material: carboxymethylcellulose, auxiliary impregnation agent: water, methanol), reinforcement non-woven according to the invention, adhesive non-woven according to the invention, calming non-woven according to the invention, single-color decorative paper impregnated with melamine-formaldehyde resin with a weight per unit area of 80 g/m², weathering-stable polyurethanacrylate coating

Example 8

Panel with Decorative Layers on Both Sides According to the Invention with a Strength Gradient for Exterior Use, High Resistance to Humidity Structure: Symmetric structure, 11 core layers (11d), in each case a stiffening layer (c) in an adhesive layer (b), in each case a calming non-woven (e), in each case a decorative layer (a2) and in each case a protective layer (a1); overall structure a1,a2,e,c,b,11d,b,c,e,a2,a1

Weathering-stable polyurethanacrylate coating, printed decorative paper impregnated with melamine-formaldehyde resin with a weight per unit area of 80 g/m², calming non-woven according to the invention, reinforcement non-woven according to the invention, adhesive non-woven according to the invention, 11 core layers from the textile fabric according to the invention impregnated with the core formulation according to the invention (2% hydrophobing agent, filler: $CaCO_3$, binding agent phenol-formaldehyde resin, solid body resin:filler ratio=1:10, auxiliary material: carboxymethylcellulose, auxiliary impregnation agent: water, methanol), reinforcement non-woven according to the invention, adhesive non-woven according to the invention, calming non-woven according to the invention, single-color decorative paper impregnated with melamine-formaldehyde resin with a weight per unit area of 80 g/m², weathering-stable polyurethanacrylate coating

Example 9

Panel with Decorative Layers on Both Sides According to the Invention with a Strength Gradient for Exterior Use, High Resistance to Humidity, Including a Calming Non-Woven Structure: Symmetric structure, 7 core layers (7d), in each case an adhesive layer (b), in each case a stiffening layer (c), in each case a calming non-woven (e), in each case a decorative layer (a2) and in each case a protective layer (a1); overall structure a1,a2,e,b,c,7d,c,b,e,a2,a1

Weathering-stable polyurethanacrylate coating, printed decorative paper impregnated with melamine-formaldehyde resin with a weight per unit area of 80 g/m², calming non-woven according to the invention, adhesive non-woven according to the invention, reinforcement non-woven according to the invention, 7 core layers from the textile fabric according to the invention impregnated with the core formulation according to the invention (2% hydrophobing agent, filler: $CaCO_3$, binding agent phenol-formaldehyde resin, solid body resin:filler ratio=1:10, auxiliary material: carboxymethylcellulose, auxiliary impregnation agent: water, methanol), reinforcement non-woven according to the invention, adhesive non-woven according to the invention, calming non-woven according to the invention, single-color decorative paper impregnated with melamine-formaldehyde resin with a weight per unit area of 80 g/m², weathering-stable polyurethanacrylate coating Table 1 contains the results of the testing of the examples. Special attention in the interpretation of the test results should be paid, on the one hand, to the particularly high mechanical strength characteristics, but also to the results of the water immersion and weathering tests of the laminates according to the invention, on the other hand.

Example 4 according to the invention surpasses the commercially available product of Example 1 with respect to the values for the bending strength by 56% and for the bending modulus by 25%. The thickness increase and the edge thickness increase of the products are comparable. The resistance against boiling water in Example 4 is also good, wherein Example 1 does not pass this test without bubble formation on the decorative sides. Example 4 surpasses clearly Example 1 with respect to the weathering stability thanks to its PUA coating.

Further improvement of the stability with respect to the humidity and also the stability under changing climatic conditions is shown by Example 6. The changes in the thickness and the edge thickness under the effect of water are by 80 and 60%, respectively, lower than those in the reference product in Example 1 The bending strengths of Example 4 after a quick climatic change exceed that of Example 1 by 75%.

Example 7 to Example 6 does not show any unfavourable effect of the calming non-woven on the water immersion properties, the heating values or the strength characteristics.

Furthermore, it has to be pointed out that the exchange of the adhesive non-woven (b) and the reinforcement non-woven (c) does not show any significant differences in the stiffness behaviour (compare Example 7/8)

With Example 9 the lowest limit of the core layers was represented in order to still be able to achieve the fire value. At lower thicknesses, the outer stiffening layers have to support more load, so that the strength values are also slightly increased.

| Example | Short title + Description | Plate structure: Number + type of layers used | Heating value according to ISO1716 | Thickness EN 438-2-5 [mm]: | Resistance to surface abrasion EN 438-2-10 [revolutions]: Starting abrasion point IP > 150 | Resistance to surface abrasion EN 438-2-10 [revolutions]: Abrasion value VVR > 350 | Resistance against immersion in boiling water EN 438-2-12 Mass increase - MZ [%] | Resistance against immersion in boiling water EN 438-2-12 Thickness increase DZ [%] | Resistance against immersion in boiling water EN 438-2-12 Edge increase KZ [%] |
|---|---|---|---|---|---|---|---|---|---|
| 1 | Themopal "Flame Protect" model | a2,xd,a2 | 2.21 | 6.50 | 200 | 450 | 10.39 | 2.84 | 2.42* |
| 2 | Core plate without decoration without hydrophobization | 8d | 2.20 | 4.62 | — | — | 12.97 | 1.11 | 0.50 |
| 3 | Single-colored melamine decor on both sides, adhesive non-woven, reinforcement non-woven, 8 cores, symmetrical | a2,b,c,8d,c,b,a2 | 2.81 | 5.46 | 200 | 450 | 14.05 | 1.23 | 1.19 |
| 4 | PUR lacquer, melamine decor print, adhesive non-woven, reinforcement non-woven, 8 cores, symmetrical | a1,a2,b,c,8d,c,b,a2,a1 | 2.94 | 5.42 | 350 | 550 | 13.91 | 0.89 | 0.88 |
| 5 | Core plate hydrophobized without decoration | 8d hydrophobic | 2.25 | 4.72 | — | — | 7.01 | 0.71 | 1.00 |
| 6 | Print, adhesive non-woven, reinforcement non-woven, 8 cores hydrophobized, symmetrical | a1,a2,b,c,8d-hydrophobic,c,b,a2,a1 | 2.87 | 5.27 | 350 | 550P | 6.56 | 0.64 | 0.96 |
| 7 | PUR lacquer, melamine decor print, calming non-woven, adhesive non-woven, reinforcement non-woven, 11 cores hydrophobized, symmetrical | a1,a2,e,b,c,11d-hydrophobic,c,b,e,a2,a2 | 2.66 | 7.10 | | | | | |
| 8 | PUR lacquer, melamine decor print, calming non-woven, reinforcement non-woven, adhesive non-woven, 11 cores hydrophobized, symmetrical | a1,a2,e,c,b,11d-hydrophobic,b,c,e,a2,a3 | | 7.10 | | | | | |

| | | | | | | |
|---|---|---|---|---|---|---|
| 9 | Print, calming non-woven, adhesive non-woven, reinforcement non-woven, 7 cores hydrophobized, symmetrical | a1,a2,e,b,c,7d-hydrophobic,c, b,e,a2,a2 | 2.94 | 4.50 | | |

| Example | Resistance against water vapor EN 438-2-14 Appearance [degree]: glossy surfaces ≥3 other surfaces ≥4 | Resistance against moisture EN 438-2-15 | | longitudinal Dimensional stability at high temperatures | | Bending strength in transverse direction EN ISO 178: 2003 Load [MPa]: | Bending modulus in transverse direction EN ISO 178: 2003 Load [GPa]: | Bending strength in transverse direction after rapid climate change EN ISO 178: 2003 Load [MPa]: |
|---|---|---|---|---|---|---|---|---|
| | | Mass increase - MZ [%] | Thickness increase - DZ [%] | EN 438-2 17 Cumulative dimensional change [%]: cross | | | | |
| 1 | 5 | 7.88 | 1.70  1.13 | 0.25 | 0.23 | 35.8 | 8.0 | 24.0 |
| 2 | — | 13.27 | 0.94  1.01 | — | | 37.0 | 7.4 | 27.0 |
| 3 | 5 | 11.58 | 1.61  1.35 | 0.25 | 0.35 | 55.0 | 11.0 | |
| 4 | 5 | 11.25 | 1.41  1.29 | | | 56.0 | 10.0 | 38.1 |
| 5 | — | 4.71 | 0.42  0.61 | — | — | 38.2 | 7.6 | 32.3 |
| 6 | 5 | 4.59 | 0.37  0.56 | | | 51.0 | 9.0 | 42.1 |
| 7 | | 4.70 | 0.50  0.52 | | | 53.0 | 9.0 | |
| 8 | | | | | | 50.0 | 8.0 | |
| 9 | | | | | | 62.0 | 11.0 | |

| Example | Bending modulus in transverse direction after rapid climate change EN ISO 178: 2003 Load [GPa]: | Scratch resistance EN 438-2-25 Force [degree]: | | Wheathering according to DIN ISO 4892-1 Atlas, cycle set forth by EN 438-2/29, wheathering time in h, grey scale | Density EN ISO 1183-1: 2004 [g/cm³]: |
|---|---|---|---|---|---|
| 1 | 4.8 | 4 | 6 | 1000 h, <4 | 2.02 |
| 2 | 5.2 | — | — | — | 1.87 |
| 3 | | 3 | 4 | | 1.39 |
| 4 | 5.2 | 4 | 6 | 3000 h, >4 | 1.91 |
| 5 | 5.4 | — | — | — | 1.92 |
| 6 | 5.4 | | | 3000 h, >4 | 1.91 |
| 7 | | | | 3000 h, >4 | |
| 8 | | | | | |
| 9 | | | | | |

*Blistering on the decorative surface
— not measured

The invention claimed is:

1. A laminate comprising:

A) a symmetrically or asymmetrically arranged laminate core, from a matrix comprising 3-17% by weight of organic binder resin 45-85% by weight of inorganic fillers 10-25% by weight of inorganic fibers, wherein the sum of the organic binder resin, the inorganic filler and the fibers is 100% and the laminate core has at least 3 core layers; however, the individual core layers after the completion of the manufacturing are inseparably bonded to each other as well as with the functional layers below and above them, and furthermore, a density of at least 1.70 g/cm³, determined according to EN ISO 1183-1:2004, a bending strength of at least 35 MPa, determined according to EN ISO 178:2003, a bending modulus of at least 7 MPa, determined according to EN ISO 178:2003, B) at least one intermediate layer, which is applied onto at least one of both surfaces of the laminate core, comprising (i) at least one stiffening layer, which is applied onto at least one of both surfaces of the laminate core, wherein the stiffening layer comprises at least one layer made of textile fabric, which has a finally consolidated B-stage binder content of 5-30% by weight, wherein these data refer to the total weight of the textile surface with a binder after its transition to the B-stage state and fibers of the textile fabric are are ceramic fibers, mineral fibers, glass fibers or mixtures thereof, and (ii) at least one adhesive layer, which is applied onto the surface of the stiffening layer facing away from the laminate core, wherein the adhesive layer comprises at least one layermade of textile fabric, which has a finally consolidated B-stage binder content of 40-80% by weight, wherein these data refer to the total weight of the textile surface with a binder after its transition to the B-stage state and fibers of the textile fabric are are ceramic fibers, mineral fibers, glass fibers or mixtures thereof, or (iii) at least one adhesive layer, which is applied onto at least one of both surfaces of the laminate core, wherein the adhesive layer comprises at least one layer made of textile fabric, which has a finally consolidated B-stage binder content of 40-80% by weight, wherein these data refer to the total weight of the textile surface with a binder after its transition to the B-stage state and fibers of the textile fabric are are ceramic fibers, mineral fibers, glass fibers or mixtures thereof, and (iv) at least one stiffening layer, which is applied onto the surface of the adhesive layer facing away from the laminate core, wherein the stiffening layer comprises at least one layer made of textile fabric, which has a finally consolidated B-stage binder content of 5-30% by weight, wherein these data refer to the total weight of the textile surface with a binder after its transition to the B-stage state and fibers of the textile fabric are are ceramic fibers, mineral fibers, glass fibers or mixtures thereof, and C) at least one decorative layer, which is applied onto the surface of the intermediate layer facing away from the laminate core.

2. The laminate according to claim 1 having a heating value ≤3 MJ/kg according to ISO 1716.

3. The laminate according to claim 1 having at least one protective layer is applied onto the surface of the decorative layer facing away from the laminate core.

4. The laminate according to claim 1 wherein the textile fabrics in the stiffening layer and the adhesive layer are fabrics made of fibers, which are processed by means of a surface forming method to a textile fabric.

5. The laminate according to claim 1 wherein the finally consolidated B-stage binder in the stiffening layer and the adhesive layer is a binder based on furfuryl alcohol formaldehyde resin, phenol formaldehyde resin, melamine formaldehyde resin, urea formaldehyde resin and the mixture thereof.

6. The laminate according to claim 1 wherein the laminate core has a mass ratio of fibers to mineral fillers of 1:3 to 1:9.

7. The laminate according to claim 1 wherein the textile fabric in the stiffening layer has a weight per unit area of between 140 and 600 g/m$^2$, wherein these data refer to a fabric without a binder.

8. The laminate according to claim 1 wherein the textile fabric in the adhesive layer has a weight per unit area of between 25 and 500 g/m$^2$, wherein these data refer to a fabric without a binder.

9. The laminate according to claim 1 wherein the total area weight of the textile surfaces used for the adhesive layer is by a minimum of 20% less than the total area weight of the textile fabrics used for the stiffening layer.

10. The laminate according to claim 1 wherein the decorative layer is a decorative paper with a weight per unit area of between 25 and 140 g/m$^2$, or a textile fabric.

11. The laminate according to claim 9 wherein the decorative layer is a textile fabric with a weight per unit area of between 30 and 250 g/m$^2$.

12. The laminate according to claim 11 wherein the textile fabric of the decorative layer has a finally consolidated B-stage binder.

* * * * *